United States Patent
Leyrer et al.

(10) Patent No.: US 8,130,791 B2
(45) Date of Patent: Mar. 6, 2012

(54) RECEIVER AND METHOD FOR PROCESSING A STREAM OF DATA PACKETS WHEN AN ERROR OCCURRED ON THE PHYSICAL LAYER

(75) Inventors: Thomas Leyrer, Geisenhausen (DE); Krzysztof Chruscinski, Bielsko-Biala (PL)

(73) Assignee: Texas Instruments Incorporated, Dallas, TX (US)

( * ) Notice: Subject to any disclaimer, the term of this patent is extended or adjusted under 35 U.S.C. 154(b) by 625 days.

(21) Appl. No.: 12/138,751

(22) Filed: Jun. 13, 2008

(65) Prior Publication Data

US 2009/0028157 A1    Jan. 29, 2009

Related U.S. Application Data

(60) Provisional application No. 61/016,748, filed on Dec. 26, 2007.

(51) Int. Cl.
*H04J 3/24* (2006.01)
(52) U.S. Cl. .................. 370/474; 370/395.3; 370/395.52
(58) Field of Classification Search .................. 370/389, 370/474, 395.3, 395.52
See application file for complete search history.

(56) References Cited

U.S. PATENT DOCUMENTS

| | | | | |
|---|---|---|---|---|
| 5,513,191 A | * | 4/1996 | Takechi et al. | 714/752 |
| 5,627,836 A | * | 5/1997 | Conoscenti et al. | 370/397 |
| 5,677,905 A | | 10/1997 | Bigham et al. | |
| 5,699,369 A | * | 12/1997 | Guha | 714/774 |
| 5,878,041 A | | 3/1999 | Yamanaka et al. | |
| 5,923,681 A | * | 7/1999 | Denton | 714/758 |
| 6,028,844 A | * | 2/2000 | Hao et al. | 370/242 |

(Continued)

FOREIGN PATENT DOCUMENTS

EP    1056297 A    11/2000

(Continued)

OTHER PUBLICATIONS

Brill, M: "Die Anwendernahen Schichten IM ISO/OSI-Modell", Elektronik, Weka Fachzeitschriftenverlag, Poing, DE, vol. 37, No. 5, Mar. 4, 1988, pp. 77/78, 80-82.

(Continued)

*Primary Examiner* — Ricky Ngo
*Assistant Examiner* — Dewanda Samuel
(74) *Attorney, Agent, or Firm* — Steven A. Shaw; W. James Brady; Frederick J. Telecky, Jr.

(57) ABSTRACT

A receiver which receives a stream of data packets including video data packets over a physical data link and drops data packets when an error on a physical communication layer is detected, wherein the receiver comprises a processor, configured so that it is able to check whether the received data packet is a video packet and whether it is corrupted by an error on the physical communication layer. If this is the case, the video packet is marked as corrupted and forwarded to the network layer. There is further provided a method for processing a stream of data packets including video data packets, the method including checking for each data packet whether it is a video data packet; checking for each video data packet whether it is corrupted by an error on the physical communication layer; marking a video packet as corrupted if it is corrupted due to an error on the physical communication layer; and forwarding the marked corrupted video packet to the network layer.

4 Claims, 4 Drawing Sheets

U.S. PATENT DOCUMENTS

| | | |
|---|---|---|
| 6,115,422 A | 9/2000 | Anderson et al. |
| 6,389,018 B1 * | 5/2002 | Clauberg .................. 370/394 |
| 6,594,262 B1 * | 7/2003 | Kwon et al. ............ 370/395.1 |
| 6,970,457 B1 * | 11/2005 | Richards et al. ............ 370/382 |
| 7,065,071 B2 * | 6/2006 | Fujita ........................ 370/352 |
| 2003/0026343 A1 | 2/2003 | Kim et al. |
| 2003/0091053 A1 * | 5/2003 | Tzannes et al. ............ 370/397 |
| 2005/0089104 A1 | 4/2005 | Kim |

FOREIGN PATENT DOCUMENTS

| | | |
|---|---|---|
| WO | 0036755 A1 | 6/2000 |
| WO | 02071640 A | 9/2002 |

OTHER PUBLICATIONS

The Layered Approach: The OSI Model, Data and Computer Communications, XX, XX, Jan. 1, 1991, pp. 446-456.

* cited by examiner

RECEIVER AND METHOD FOR PROCESSING A STREAM OF DATA PACKETS WHEN AN ERROR OCCURRED ON THE PHYSICAL LAYER

CROSS-REFERENCE TO RELATED APPLICATIONS

This application claims priority under 35 U.S.C. §119 to and incorporates by reference U.S. Provisional Application No. 61/016,748, filed Dec. 26, 2007, entitled "RECEIVER AND METHOD FOR PROCESSING A STREAM OF DATA PACKETS WHEN AN ERROR OCCURRED ON THE PHYSICAL LAYER", Thomas Leyrer and Krzysztof Chruscinski, inventors. This application claims priority under 35 U.S.C. §119 to and incorporates by reference Germany Patent Application Number 10 2007 035 262.1, filed Jul. 27, 2007.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention generally relate to a electronic device for use in a communication system, the system comprising a physical communication layer, a network layer and an application layer. More particularly, embodiments of the invention relate to a receiver which receives a stream of data packets including video data packets over a physical data link and which drops data packets when an error on the physical communication layer is detected.

Communication systems as the Internet but not limited to the Internet are often structured according to a more-layer model as for example the OSI model (open systems interconnection model) or the TCP/IP model (transmission control protocol/internet protocol). In the different layers different communication protocols may be used. Data including audio and video data are transmitted in a stream of data packets. A usual video data packet contains about 1165 bytes, including e.g. 20 bytes IP header, 8 bytes UDP header, 12 bytes RTP header und 6*188 bytes video data. Most of the communication protocols use error detection methods. Data packets are, for example, provided with a check sum allowing a redundancy check on the data packet for detecting any errors. Data packets may also be provided with a packet length check controlling the number of transmitted bits. Depending on the protocol a corrupted data packet is either dropped without any signaling or dropped and retransmission is requested. There are also protocols such as the UDPlite which allow the forwarding of a corrupted packet.

A common medium to transmit the data from the internet to the end-user or more precisely from a central office to the subscriber is the so-called digital subscriber line (DSL). The digital subscriber lines often use the old twisted pair cables which are in use since long for the transmission of analogue telephone signals as well as for digital telephone signals. To be able to transmit digital data with a high bit rate over the twisted pair, usually the ATM transmission (asynchronous transfer modus) is used: the data of one data packet is transported by a plurality of ATM cells, an ATM cell including only 48 bytes of information whereas a video data packet transported via Internet includes typically 9320 bits for an MPEG2 transport stream. Each ATM cell is provided with a header containing address information in the form of VPI/VCI (virtual path identifier/virtual channel identifier) pairs. The ATM cell containing the last bits of a data packet further contains an end of packet (EOP) bit and information about the data packet length. The stream of ATM cells is then scrambled and modulated as known in the state of the art for transmission, for example using the orthogonal frequency division multiplexing (OFDM).

These digital subscriber lines implemented by a twisted pair cable are sensitive to impulse noise. The expression "impulse noise" relates to short, occasionally occurring interferences. There are solutions known to protect the DSL against impulse noise but they reduce the usable range of the physical subscriber line. Therefore, operators make a compromise between error correction and range. If corrupted ATM cells are detected, whether corrupted due to impulse noise or for other reasons, the whole data packet is dropped, even if there is only one corrupted ATM cell which transports only a small part of a data packet. In the case of video packets, this loss of packets is seen by the end-user as an artifact on the screen.

Analyses have shown, that due to impulse noise there are typically about 50 bit errors in a packet containing 9320 bits. Modern video decoder can handle an error rate of 50 bits out of 9320 bits without generating an artifact visible to the end customer. SUMMARY Embodiments of the invention provide a receiver. The receiver comprises a processor which may be configured to check for each received data packet whether it is a video data packet and whether it is corrupted by a specific error on the physical communication layer. The processor may be further configured to mark a video packet as corrupted if the cell is corrupted due to a specific error on the physical communication layer and to forward the marked corrupted video packet to the network layer. In general, video packets may be corrupted for other reasons than the specific errors on the physical communication layer. In this case, there may be a great number of bits corrupted and the video data packet must be dropped. It is also possible that a hacker may try to enter the end-user's system so this video packet must be dropped, as well. There are also applications for which data other than video data is transported and for which the transmission of a corrupted data packet may have severe consequences. Therefore, the processor included in the inventive receiver maybe configured to forward only corrupted video data packets and only if they are corrupted by a specific error on the physical communication layer. Preferably, the specific error is detected at the output of demodulator provided in the receiver.

In a preferred embodiment, the data packets are received in the form of ATM cells and the processor is configured to check for each ATM cell whether it is a potential cell for video data.

In a preferred embodiment, the processor is further configured to detect whether the ATM cell header is corrupted and preferably restores an ATM cell header of the corrupted cell. As an ATM cell header comprises the address of the cell, if there is no correction of the cell header, the cell will be rooted incorrectly leading to a complete loss of the cell contents, possibly even coupled with damage to unrelated data. Preferably, the network layer comprises a table of valid VPI/VCI pairs which carry video streams. Thus, the processor can compare the VPI/VCI pairs given in the ATM cell header of the corrupted cell with the VPI/VCI pairs included in the table.

For transmission of the digital data stream, the data stream may be scrambled and modulated to be transmitted as a modulated signal adapted to the transmission band of the twisted pair cable. After demodulation, the signal may be descrambled. If the transmission is disturbed by the specific error, the descrambler outputs a specific bit error pattern. In a preferred embodiment, for restoring a corrupted VPI/VCI address the processor may be configured to correct the address based on the bit error pattern and on a correlation function.

An ATM cell which comprises the last data bits of a data packet has a so-called EOP bit set (end of packet) and contains information about the data packet length. Thus, it is possible to detect a data packet length. The processor may be preferably configured to verify if a data packet length is a typical video data packet length and if there is no typical video packet length detected, the corrupted ATM cell is dropped.

In a preferred embodiment, the receiver further includes segmenting and reassembling means which are configured to remove the ATM cell headers and to reassemble the data packets. Data packets are usually provided with a check sum allowing a redundancy check on the data packet for detecting any errors. The segmenting and reassembling means included in the inventive receiver is further configured to perform such a redundancy check on the data packets and to mark a video data packet as corrupted if the redundancy check is negative. The marked video data packet is then forwarded to the network layer. Thus, data packets with a negative redundancy check are forwarded if they are video data packets and if corruption is due to the specific physical error.

Preferably, the receiver further comprises verification means which recalculate a check sum if the redundancy check was negative. Thus, the following network layer will see a valid check sum and treat the data packet as a non-corrupted data packet.

In the preferred embodiment, the physical data link is a digital subscriber line comprising a twisted pair cable and the error occurring on the physical communication layer is due to impulse noise.

Preferably, the processor is implemented by software programmed into a microprocessor of Digital Signal Processor (DSP).

Embodiments further provide a method for processing a stream of data packets which include video data packets. The inventive method includes checking for each data packet whether it is a video data packet; checking for each video data packet whether it is corrupted by a specific error on the physical communication layer; marking a video packet as corrupted if it is corrupted due to the specific error on the physical communication layer; and forwarding the marked corrupted video packet to the network layer.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
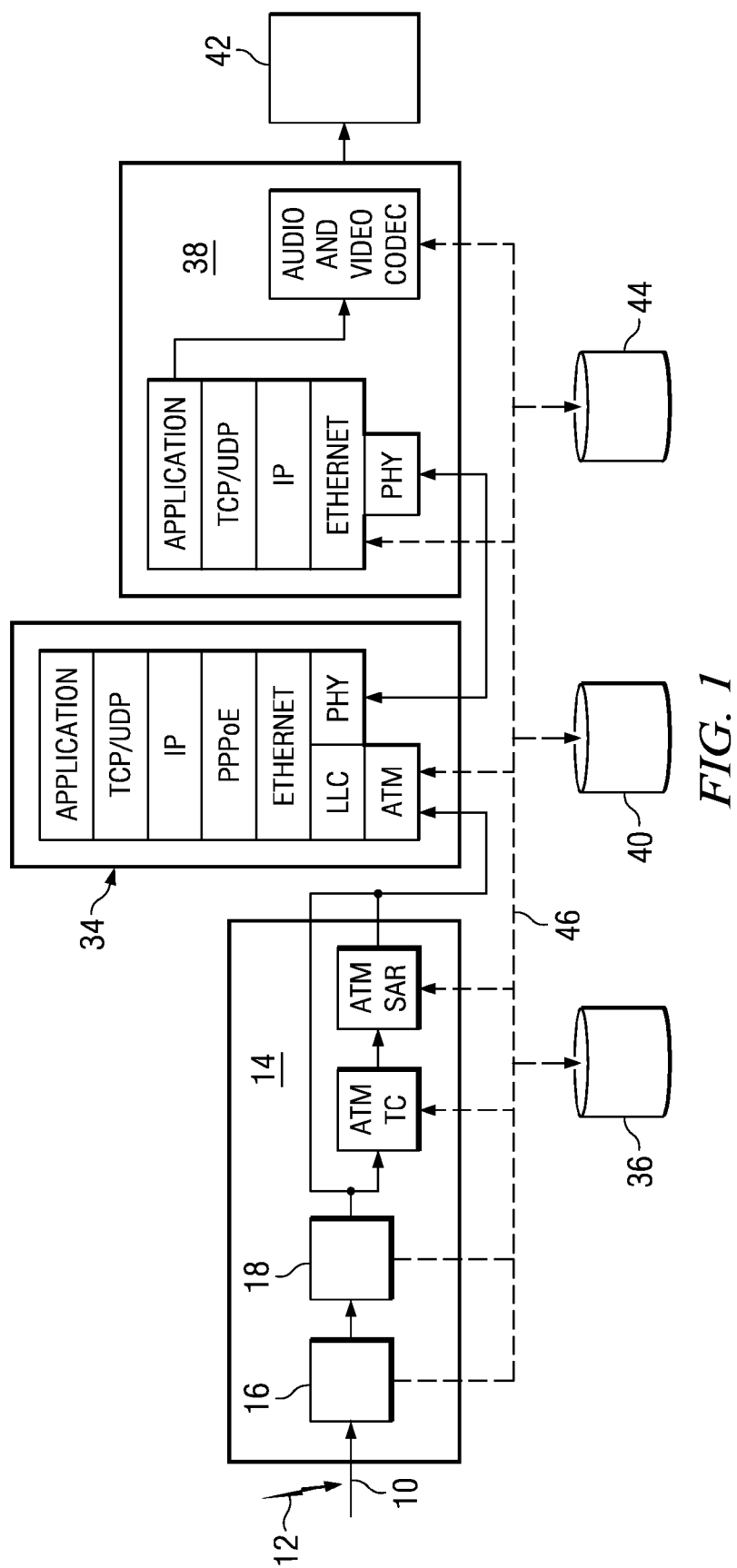
FIG. 1 is a schematic diagram of the inventive receiver.

In FIG. 1 processing of data packets in an inventive receiver is visualized. The receiver in the embodiment shown is a so-called customer's premises equipment (CPE), i.e. the processing is performed on the end-user side. On a physical data link 10 which is a digital subscriber line (DSL) a stream of data packets arrives. The digital subscriber line 10 in the embodiment shown is a twisted pair cable as used in the state of the art since long for telephone lines. The stream of data packets is modulated as known in the state of the art for transmission, for example using the orthogonal frequency division multiplexing (OFDM). Signal transmission is disturbed by an impulse noise 12. In a DSL-modem 14 which includes a processor which performs processing on the physical layer, the modulated signal is demodulated in a demodulator 16 and descrambled in a descrambler 18. As there is a specific error on the physical layer, i.e. an impulse noise 12, descrambler 18 will output a typical bit error pattern.

In the preferred embodiment described all processing steps are software-implemented. Dashed lines symbolize that information about the processing steps may be saved and used in other processing steps. This concerns for example the typical bit error pattern. If the descrambler 18 outputs a specific bit error pattern an error is detected and signalized as err_phy-crc. Then the stream of data packets which is at this state actually a stream of ATM cells is processed in an ATM TC unit (asynchronous transfer modus transmission conversions).

Figure 2:
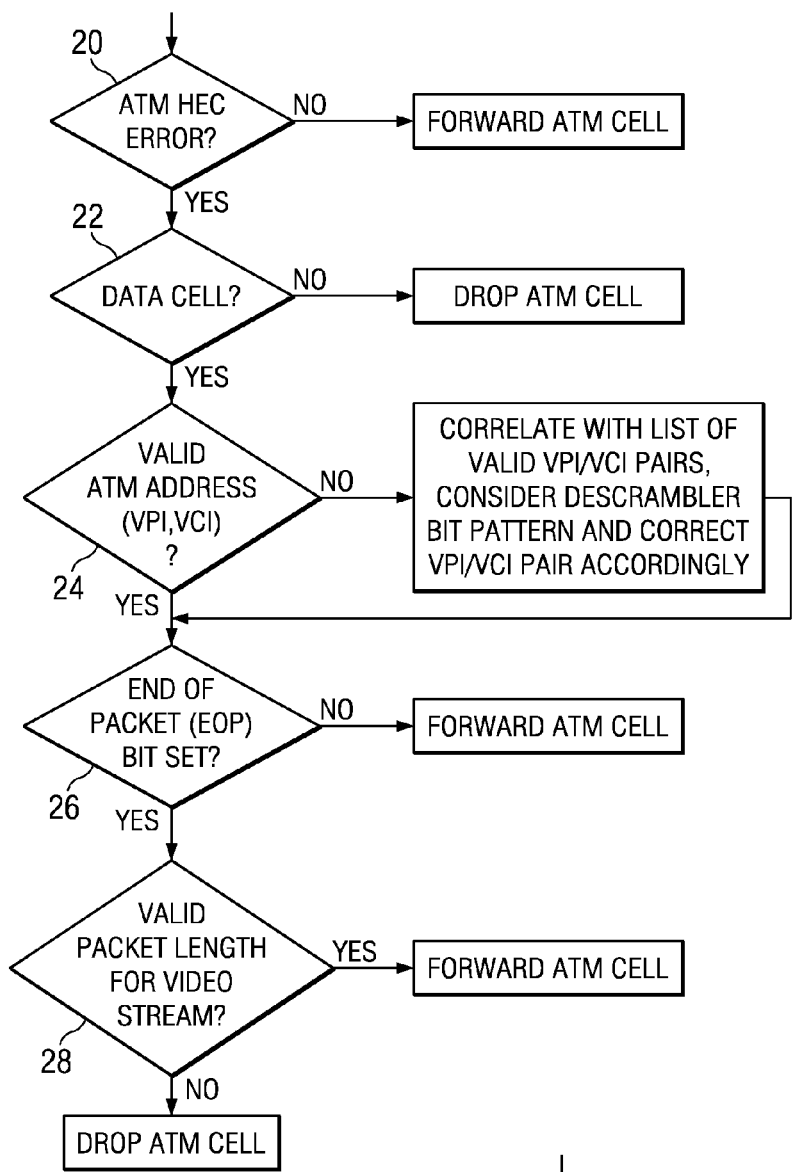
FIG. 2 is a flow-chart showing the processing of the data packets at the ATM TC layer.

Now processing on the ATM TC layer will be further explained with reference to FIG. 2. In a processing step 20 the ATM header is checked for an ATM HEC (header error control) error. If there is no error the ATM cell will be forwarded. If there is an error detected, in a following step 22 it will be decided whether the ATM cell is a data cell or a so-called OAM cell (operation and maintenance). If it is no data cell the ATM cell will be dropped. For a data cell the ATM address contained in the ATM header will next be checked in a step 24. If the address is valid, a table of valid VPI/VCI pairs provided in the network layer may be checked for knowing whether the detected valid VPI/VCI pair should carry a video stream. If yes the ATM cell undergoes the next processing step 26. With an invalid address the table of valid VPI/VCI pairs is checked, the typical bit error pattern output from descrambler 18 is considered and using a correlation function the address is corrected before performing step 26. OAM cells use different VPI/VCI pairs and have six bits reserved field at the end of the payload. A cross check can be made by verifying the received header check sum with the new VPI/VCI pair.

Although identification of a video packet is preferably done by the ATM address (VPI/VCI), it is also possible to use for identification the MAC address, the VLAN tag, the IP address, the port number or the IP packet length.

If a valid ATM address is detected or if the ATM address has been corrected, then in processing step 26 it will be checked whether the end of packet (EOP) bit is set. If there is no EOP bit set, the ATM cell will be forwarded. If it is set, there will be a verification in processing step 28 of the packet length to see whether a typical video packet length is met. If a typical length is not met, then the ATM cell will be dropped. Otherwise, the ATM cell will be forwarded. Thus, in the ATM TC unit the ATM cell is either dropped or forwarded to the ATM segmenting and reassembling unit (SAR) depending on a number of processing steps. If the ATM TC unit detects a header error this error is signalized as err_tc-hec. These error signals are saved by the software program.

Figure 3:
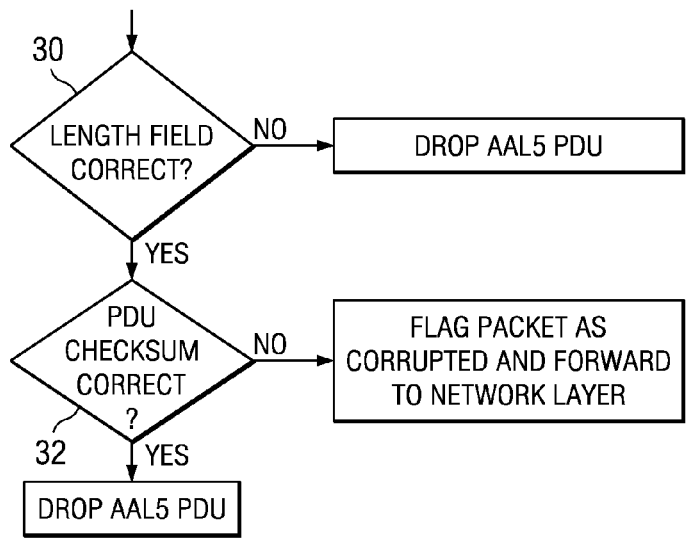
FIG. 3 is a flow-chart showing the processing of the data packets at the ATM AAL5 SAR layer.

Processing in the ATM SAR layer, which corresponds to the so-called ATM application layer 5 (AAL 5) will now be explained with reference to FIG. 3. In the ATM SAR unit the ATM cell headers are removed and the data packets are reassembled. In processing step 30 the length field is checked. This is possible as the last ATM cell of a protocol data unit (PDU) has a so-called PDU-trailer which contains length and check sum. In case the EOP bit is corrupt then the length check will result in an error, there is also an error when ATM cells of the packet were dropped. Packets with invalid length field will be dropped and an error err_sar_length will be signalized.

If the length field is correct the check sum will be checked in processing step 32. If the PDU check sum is not correct an error err_sar_crc will be signalized and the packet will be marked or flagged as corrupt and forwarded to the network layer. If the PDU check sum is correct the AAL5 PDU packet will also be forwarded. Further optimization can be made by correlating the length check in AAL5 SAR with corrupted ATM header EOP bit and predefined packet length of video packets. This assumes that in case the ATM cell header is corrupted the length field in the ATM cell payload is correct and fits the size of a video packet. As mentioned before, as the process is software-implemented, these error signals can be saved in a memory.

Thus, from the physical layer unit (e.g. DSL-Modem 14) in FIG. 1 a reassembled data packet will be forwarded to a network layer unit and in the preferred embodiment it is forwarded to a block 34. If the reassembled data packet is a video packet which is corrupted due to impulse noise on the digital subscriber line 10 it will be flagged or marked as corrupted. A data packet which is not a video data packet and which was corrupted will have been dropped in the physical layer. FIG. 1 further shows a cylinder 36 symbolizing the physical layer configuration and the physical layer statistic. The physical layer configuration includes framing parameters, scramblers, an error correction, an error location, a bit allocation and so on whereas the physical layer statistic comprises channel capacity, channel stability, corrected errors and uncorrected errors, cell synchronization, cell header errors, cell types and packet error. This information can be used throughout all processing steps. As all processing is performed by a software program, the different errors detected and the before-mentioned information can be saved and accessed by the software program whenever needed.

Block 34 is optional and stands for a so-called media gateway. In block 34 the protocol stack of the arriving data packet can be adapted to the final receiving device, which may be for example a DECT-telephone, a mobile phone, a personal computer, and so on. FIG. 1 does not only show a connection from the ATM SAR output to the input of unit 34 but as well a direct connection from the descrambler output 18 to the media gateway 34. This depends on whether block 34 can treat directly ATM cells or not. The protocol stack in unit 34 comprises on top an application, underneath the TCP/UDP (transmission control protocol/user datagram protocol), underneath the IP (Internet protocol) and underneath the PPPoE (point-to-point protocol over Ethernet), underneath Ethernet and on the input side LLC (logical link control which is the upper sublayer of the OSI data link layer) and ATM. Whereas on the output side there is "Phy" marked for symbolizing the physical layer without specifying the protocol used on the physical layer as this protocol depends on the final receiving device.

Block 34 is controlled by the same software program as block 14 and data may be exchanged which is indicated by dashed lines. A cylinder 40 stands for the network layer configuration and the network layer statistic. The network layer configuration comprises a network address, traffic type, packet type, security questions, quality of service, error correction and so on. The network layer statistic comprises packet errors at various levels, for example Ethernet, IP and UDP, as well as packet length and so on.

FIG. 1 also shows as final receiving device a block 38 the input of which is connected to the output of block 34 but could also be connected directly to unit 14, provided that the protocol in the physical layer is chosen accordingly.

Block 38 comprises on the left hand side the network layer with a protocol stack comprising from up to down the application, TCP/UDP, IP, Ethernet and the physical layer protocol symbolized by "Phy". On the right hand side of block 38 there is the application layer, which in the case of a video data packet comprises an audio and video codec which outputs to a video display and speakers 42.

Block 38 is controlled by the same software program as blocks 14 and 34 and data may be exchanged which is indicated by dashed lines. A cylinder 44 symbolizes the application layer configuration and the application layer statistics. The application layer configuration comprises security, audio codec, video codec, error correction and so on whereas the application layer statistic includes dropped packets, out-of-synchronization packets, delayed packet, PSNR (peak signal-to-noise ratio, a characteristic of the video quality) and others.

According to the dashed line 46 in FIG. 1 it is possible in all layers to access the different information contained in these cylinders.

Figure 4:
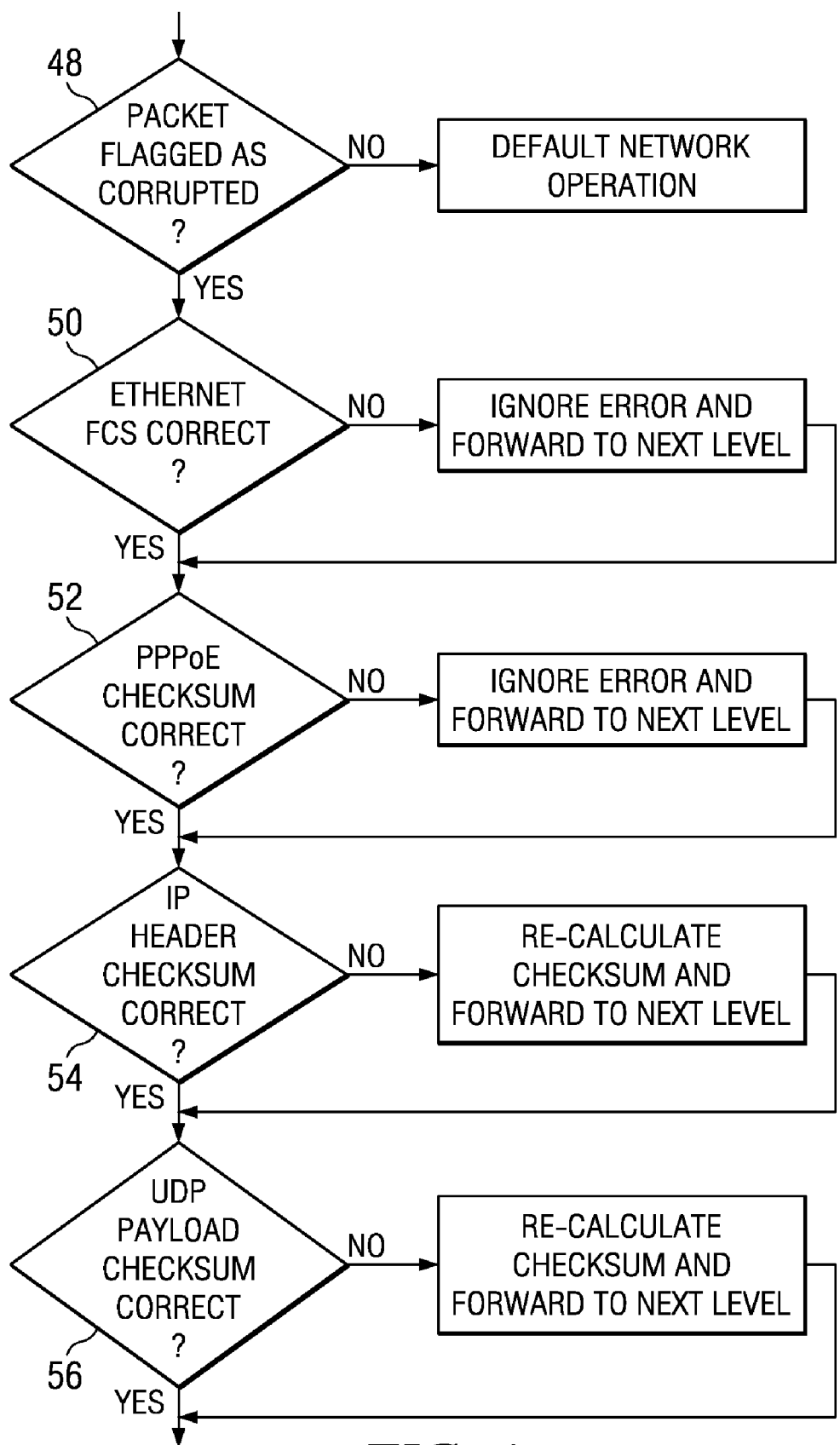
FIG. 4 is a flow-chart showing the processing of the data packets at the network layer.

Processing at the network layer will be further explained with reference to FIG. 4. At a step 48 it is detected whether the packet is flagged as corrupted. If not the default network operation is performed. If yes, a check 50 is performed on the next protocol layer. According to FIG. 1, this is the Ethernet layer. For Ethernet, a current check is to control the frame check sequence (FCS). Because the packet is marked as corrupted, an error will be ignored and the packet will be forwarded to the next level even if the FCS is not correct. Of course, the packet will also be forwarded if FCS is correct. According to FIG. 1, the next protocol level is the PPPoE. Here, the check sum is controlled at processing step 52. As for the Ethernet level, the packet will be forwarded to the next level even with an error detected. The next level to be checked at step 54 is the Internet protocol. If the IP header check sum is not correct, the check sum is recalculated and forwarded to the next level. The next protocol level is the user datagram protocol. Here, the payload check sum is controlled at step 56. If the check sum is not correct, the check sum is recalculated and forwarded to the next level. Of course, packets with no errors detected will be forwarded as well. Thus, for a packet flagged as corrupted, wrong check sums are recalculated on the IP level and/or on the TCP/UDP level, so that a following device will treat the packet on these levels as an undisturbed packet.

Figure 5:
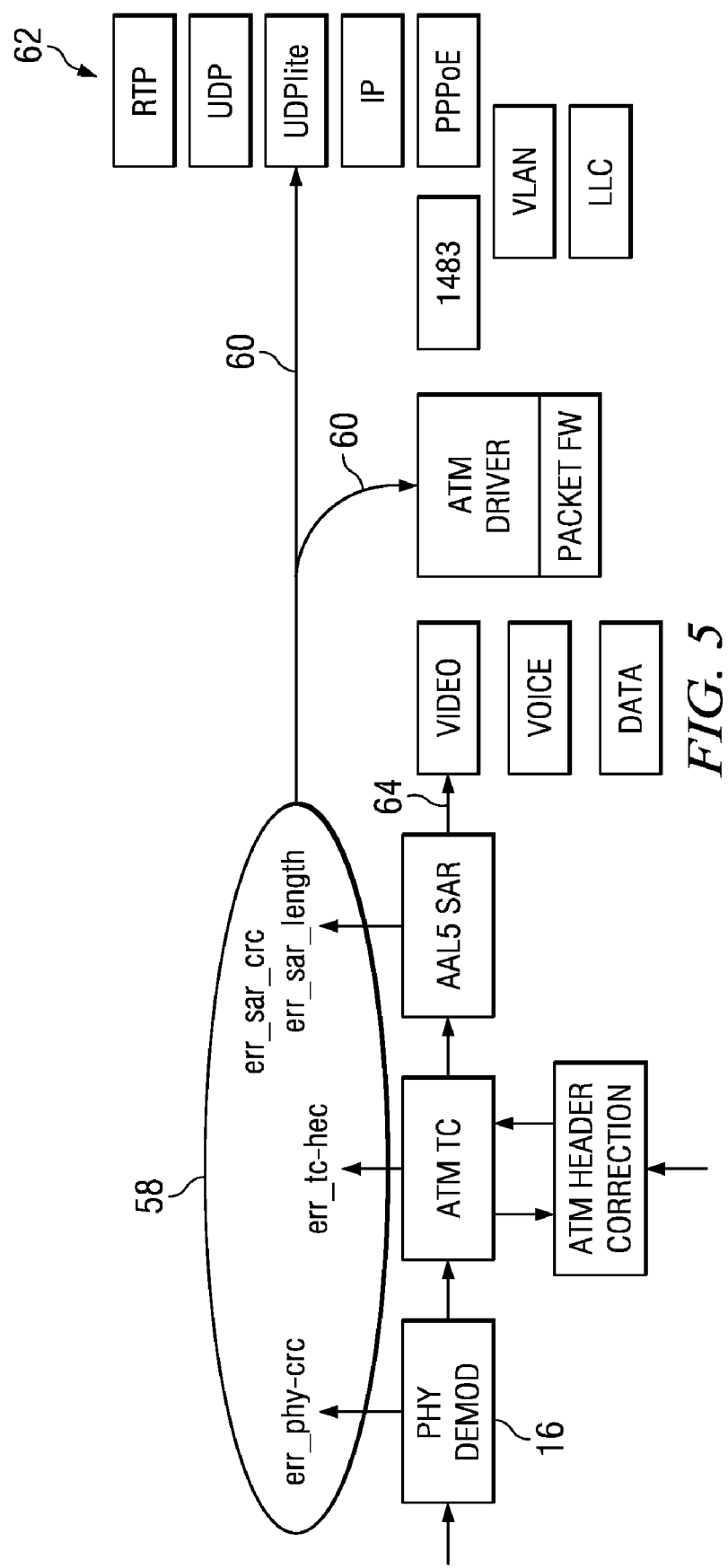
FIG. 5 is a schematic diagram further explaining the inventive processing steps.

FIG. 5 visualizes the inventive combination of physical layer information with the knowledge on video stream to decide on packet forwarding. On the left hand side is the physical layer with the physical demodulator 16, the ATM TC and the AAL5 SAR. Each of these three units signalizes a detected error, as shown in an ellipse 58 and already explained above. This error information is transmitted as visualized by two arrows in bold lines 60 to an ATM driver and to a network layer protocol stack 62. The ATM driver corresponds to block ATM in FIG. 1 inside the block 34 and the transmission of error information is visualized in FIG. 1 by dashed lines 46. Furthermore, an arrow 64 between the block AAL5 SAR and the video block signalizes that a video packet was detected. The ATM driver can thus decide to forward the packet depending on the kind of error detected and on the knowledge that the packet is a video data packet. Additionally, the protocol UDPlite may by used on the network layer, which is a subform of the protocol UDP allowing forwarding of corrupted packets. The protocol stack 62 which is shown in FIG. 5 on the network layer differs slightly from the protocol stack in FIG. 1 showing more details and/or other options. It is a protocol stack as used for example in a router. On top is the real-time transport protocol (RTP) which defines a standardized packet format for delivering video over the Internet. The number 1483 stands for a protocol according to a request for comments 1483 which deals with a multiprotocol encapsulation over AAL5. The abbreviation VLAN relates to a virtual local area network.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for processing a stream of data packets including video data packets, the method comprising:
    receiving a plurality of data packets in the form of ATM cells on a physical communication layer;
    checking each received ATM cell to determine whether the ATM header is corrupted due to a physical error that occurred during transmission of the data packets;
    checking each received ATM cell with corrupted ATM header to determine whether it is a potential cell for video data;
    restoring the corrupted ATM header;
    comparing a VPI/VCI pair given in the ATM cell header of the corrupted cell with the VPI/VCI pairs included in a table of valid VPI/VCI pairs carrying video streams;
    determining the correct VPI/VCI address based on a bit error pattern output from a descrambler descrambling the stream of data packets and based on a correlation function, when the VPI/VCI pair given in the ATM cell header of the corrupted cell is not included in the table, and
    correcting the address in the ATM cell header accordingly.

2. A method for processing a stream of data packets including video data packets, the method comprising:
    checking for each received ATM cell whether the ATM header is corrupted due to a physical error that occurred during transmission of the data packets;
    checking for each received ATM cell with corrupted ATM header whether it is a potential cell for video data;
    restoring the corrupted ATM header
    removing the ATM cell headers;
    reassembling the data packets transmitted in the ATM cells;
    effectuating a redundancy check on the data packets,
    marking a video data packet as corrupted if the redundancy check is negative; and forwarding the marked video data packet to the network layer.

3. The method of claim 2, further comprising:
    recalculating a check sum for a marked video data packet.

4. The method 3, wherein the method is applied to a stream of data packets transmitted over a digital subscriber line comprising a twisted pair cable and wherein the physical error that occurred during transmission is due to impulse noise.

* * * * *